J. B. FULLER.
MAGNETO ELECTRIC MACHINES.
No. 179,184. Patented June 27, 1876.
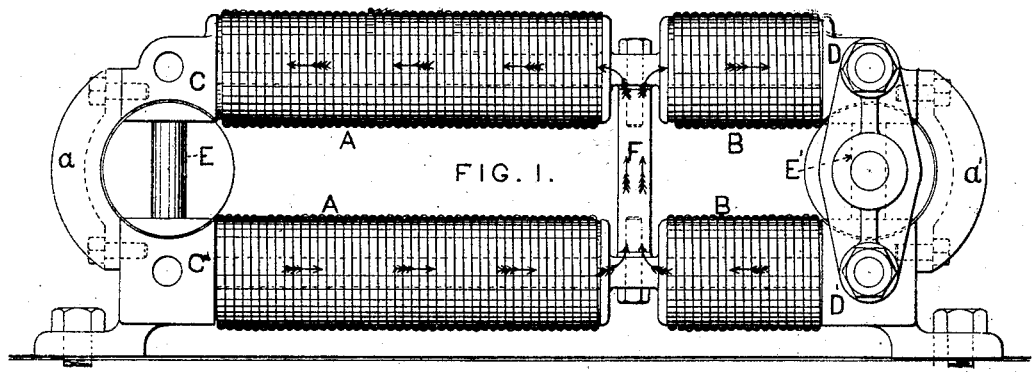
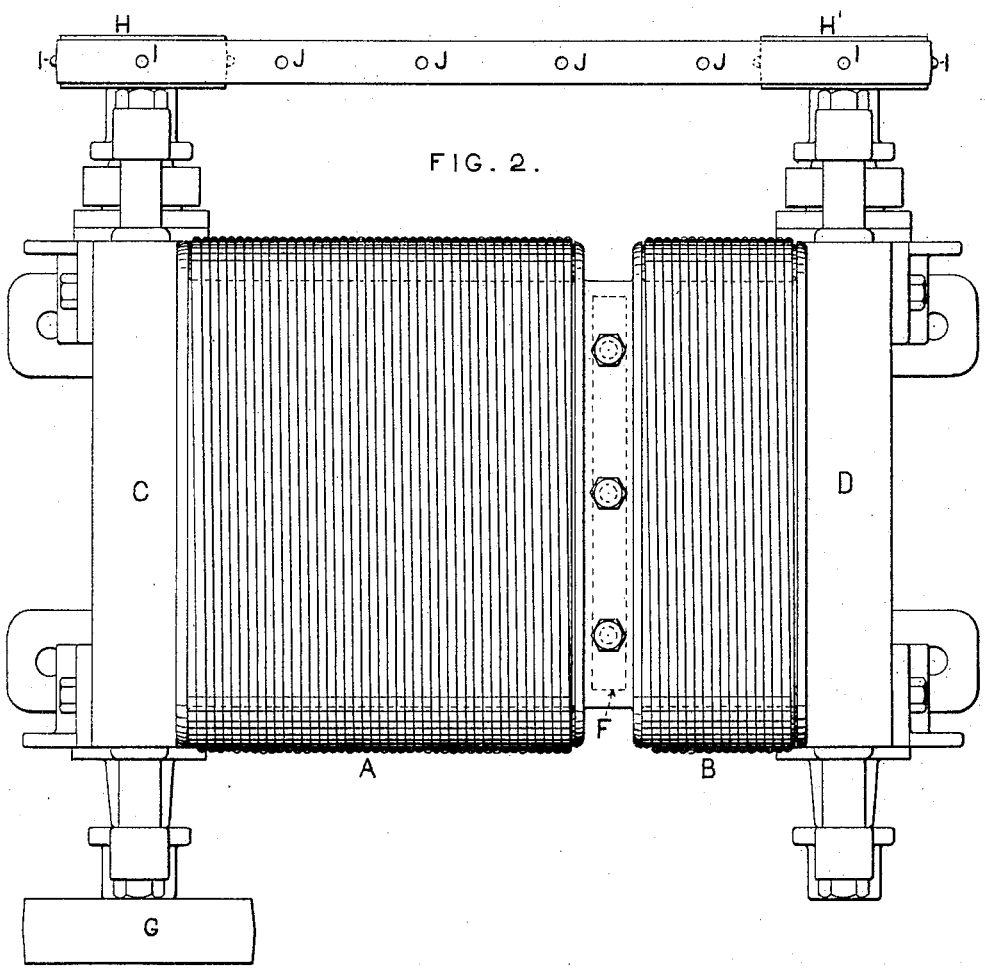
WITNESSES.
INVENTOR.

UNITED STATES PATENT OFFICE.

JIM BILLINGS FULLER, OF NEW YORK, ASSIGNOR, BY MESNE ASSIGNMENTS, TO HENRY KIP, OF BROOKLYN, N. Y.

IMPROVEMENT IN MAGNETO-ELECTRIC MACHINES.

Specification forming part of Letters Patent No. 179,184, dated June 27, 1876; application filed January 14, 1876.

*To all whom it may concern:*

Be it known that I, JIM BILLINGS FULLER, of the city of New York, N. Y., have invented a new and useful Improvement in Magneto-Electric Machines, of which the following is a specification:

My invention relates to magneto-electric machines which employ two sets of electro-magnets and two revolving armatures; and consists in a bridge or connecting-plate so arranged and connected to said magnets as to constitute the neutral magnetic point in both sets.

In the drawing, A A and F represent one of the magnets, and B B and F the other, the cores being shown dotted. The bridge F is a heavy iron plate, firmly secured to the magnet-cores, substantially as shown, or the whole may be cast together.

In order that both of these magnets shall produce in the bridge F the same polar condition, it is necessary to coil them so that the poles C and D are similar, while the poles C and C' are dissimilar. The poles C' and D' are similar, while D and D' are dissimilar, from which it will be evident that the polar direction from the south poles—say, C' and D'—will be alike through the bridge F toward the north poles C and D.

The relative strength of the two magnets will depend on the location of the bridge and the relative length of each set of cores. Each magnet will be independent of the other, and possess at the poles all the characteristics of separate magnets.

Between the poles of these magnets armatures of any ordinary construction, and coiled with conducting material, may be caused to revolve, producing in the coils of said armature electric currents, and the currents of one armature may be employed in exciting the electro-magnets aforesaid, while the currents from the other armature may be employed for any industrial or other useful purpose.

The drawing represents several devices well known, not here described, which may be used in the construction of such machines; but as they constitute no part of the invention their description is unnecessary. I prefer in such machines to use the "Siemens armature," which is so well known as to be easily adapted to my improvement without description.

I claim as my invention—

In a magneto-electric machine, a double or duplex electro-magnet, connected together by a bridge or plate, F, so as to constitute two independent sets of magnetic poles, the said bridge forming the neutral magnetic point in both sets of magnets, substantially as and for the purpose specified.

JIM BILLINGS FULLER.

Witnesses:
PHILIP S. PENTZ,
E. D. MACKINTOSH.